Aug. 14, 1956 M. W. THORNTON Re. 24,194

FISH STEAKING DEVICE

Original Filed Sept. 1, 1950 2 Sheets-Sheet 1

INVENTOR

MATHEW H. THORNTON

BY Chas. E. Reif.

ATTORNEY

FISH STEAKING DEVICE

Original Filed Sept. 1, 1950 2 Sheets-Sheet 2

INVENTOR
MATHEW H. THORNTON

BY Chas. C. Reif
ATTORNEY

United States Patent Office

Re. 24,194
Reissued Aug. 14, 1956

24,194

FISH STEAKING DEVICE

Mathew H. Thornton, St. Paul, Minn.

Original No. 2,680,877, dated June 15, 1954, Serial No. 182,693, September 1, 1950. Application for reissue December 7, 1954, Serial No. 473,773

7 Claims. (Cl. 17—8)

Matter enclosed in heavy brackets [ ] appears in the original patent but forms no part of this reissue specification; matter printed in italics indicates the additions made by reissue.

This invention relates to a device for holding a fish while it is being steaked. It is desirable to have such a device which is provided with a means for placing longitudinal tension on a fish held therein and which device is provided with a means for determining the plane of a cutting blade used to steak the fish so that the steaks at either side of the fish may be uniformly and accurately cut.

It is an object therefore of this invention to provide a device adapted to hold a fish by placing longitudinal tension thereon and to provide a means for determining the plane of a cutting blade used to steak said fish in order to efficiently cut said steaks of a desired and uniform thickness.

It is another object of this invention to provide a device having in combination, *a supporting means such as* a frame having means secured to the ends of said frame adapted to engage and hold the ends of a fish to securely hold the same in position, a pair of guide bars extending longitudinally of said frame and adapted to guide a cutting blade in various planes and said bars also being adapted to occupy different positions transversely of said frame.

It is a more specific object of this invention to provide a device having in combination, an open frame of a generally rectangular form provided with a handle, a pair of gripping means respectively secured to opposite ends of said frame and adapted to hold a fish under tension therebetween, said means having spring pressed jaws for gripping said fish, a pair of guide bars respectively disposed on either side of said gripping means extending longitudinally of said frame and rotatably secured thereto whereby said bars can guide a cutting blade in various planes.

These and other objects and advantages of the invention will be fully set forth in the following description made in connection with the accompanying drawings in which like reference characters refer to similar parts throughout the several views and in which.

Figure 1:
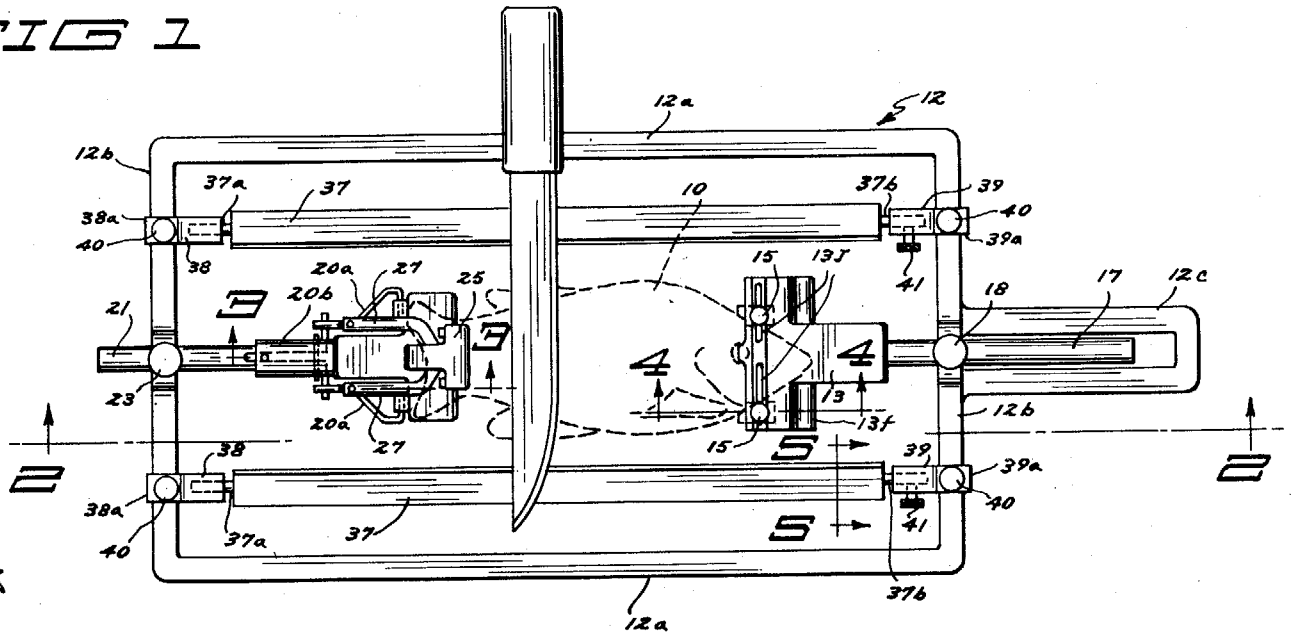
Fig. 1 is a top plan view of applicant's device shown in operating position.
Figure 2:
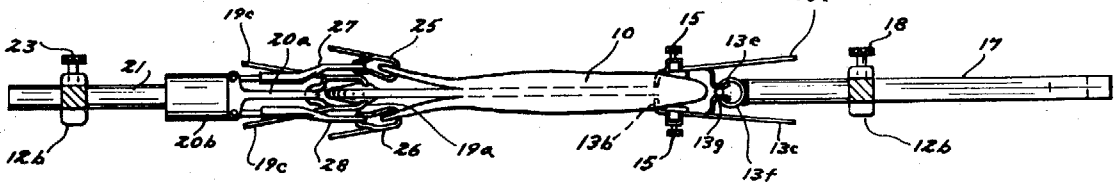
Fig. 2 is a view in side elevation taken on line 2—2 of Fig. 1, as indicated by the arrows, with some parts shown in vertical section.

Referring to the drawings, with special reference to Fig. 1, *a supporting means in the form* of a substantially rectangular frame member 12 is shown having side portions 12a and end portions 12b. In the embodiment of this invention as illustrated, said sides are shown as being rectangular in vertical cross section. Said frame has a handle 12c at one end. Said handle is shaped in the form of an elongated U with the spaced ends being secured to said frame.

Figure 4:
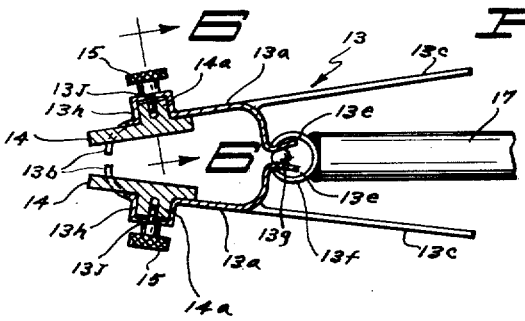
Fig. 4 is a view similar to Fig. 3 taken on line 4—4 of Fig. 1, as indicated by the arrows.
Figure 6:
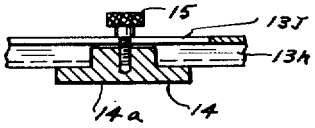
Fig. 6 is a view taken on line 6—6 of Fig. 4, as indicated by the arrows, with some parts shown in vertical section.
Figure 5:
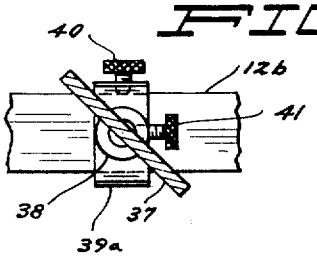
Fig. 5 is a view taken on line 5—5 of Fig. 1, as indicated by the arrows.

With reference to Figs. 1 and 4, a clamping member 13 is provided. Said clamping member is made of any suitable material, such as spring steel sheet material. Said clamping member has swingingly connected portions 13a forming spring pressed jaws 13b at their forward ends and forming handle portions 13c at their rear ends. Said portions 13a have inwardly extending flanges 13e. A split cylinder 13f is provided which extends transversely of said clamp and into which flanges 13c extend. Disposed between the flanges 13e in said cylinder are a pair of balls 13g. Cylinder 13f is rigidly attached to a bar 17, as by welding. Said bar is shown as being cylindrical and extending slidably through one end 12b of said frame 12 and into the recess in handle 12c. The said portions 13a of said clamp have outwardly extending channels 13h formed therein and extending thereacross. Said channels are shown as being rectangular in vertical cross section and are provided in their outer sides with slots 13j respectively extending for the greater distance of the width of said channels. Block portions 14 are provided which are of a narrow elongated rectangular form and which are rectangular in vertical cross section. Said block portions 14 respectively have upper portions 14a adapted to be slidably received in channels 13h. Set screws 15 are provided having knurled heads and adapted to be disposed respectively in said slots and respectively threaded into each of said block portions 14a. Hence said blocks 14 are adapted to have lateral movement in said channels and may be held in various positions by said set screws 15. Said blocks have recesses with concavely curved walls at their adjacent sides. Bar 17 which carries clamp 13 can be held in various positions longitudinally of said frame.

Figure 3:
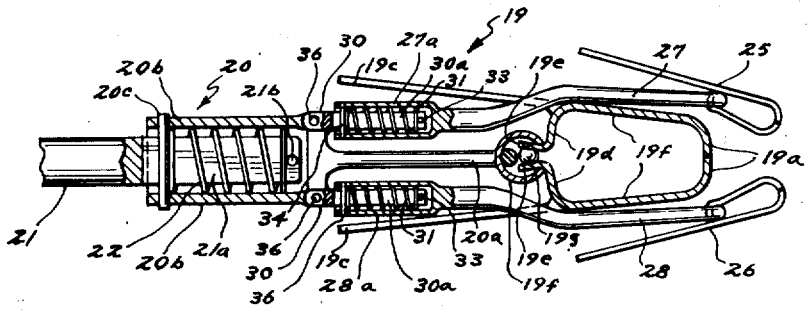
Fig. 3 is a view in side elevation taken on line 3—3 of Fig. 1, as indicated by the arrows, with some parts shown in vertical section.

At the end of said frame opposite clamping members 13 is a clamping member 19, as shown in Figs. 1 and 3. Said clamping member 19 as well as clamp 13 is made of any suitable material, such as steel sheet material which is preferably resilient. Said clamping member 19 is similar member 19 is similar in constructon to clamp 13 and has portions 19a. Said clamping member 19 has a central portion 19b which extends rearwardly and outwardly to form handle portions 19c. The portions 19d adjacent the outer sides of said clamping member form a flange portion 19e at the rear of said clamping member. A split cylinder 19f is provided having an opening longitudinally thereof and adapted to receive said flange portion 19e therein. A small rod or ball 19g is disposed between flange portions 19e, said flange portions being adapted to receive the same.

A casing 20 is provided of cylindrical form and having a closed inner end. Respectively extending outwardly horizontally from said closed end and diverging for a short distance are two rods 20a, said rods having reversely bent end portions disposed in axial alignment and extending into the end portions of cylinder 19f whereby said casing is pivotally secured to said cylinder 19f and clamp 19.

A rod 21, shown as cylindrical, is provided which has a slotted or bifurcated end portion 21a. Said slotted end portion is disposed in said casing 20b. A compression coiled spring 22 surrounds said end portion 21a and is disposed in casing 20b. One end of said spring bears against a pin 21b extending through the bifurcations of member 21a and secured therein adjacent their ends. The other end of said spring bears against a pin 20c which extends through casing 20b and between the bifurcations of rod 21. Rod 21 is slidably disposed in said frame member 12. A set screw 23 is threaded into said frame and holds rod 21 in various positions.

Clamping members 25 and 26 are provided respectively disposed above and below clamping member 19. Clamping members 25 and 26 are of the ordinary variety of a spring type clamp and have one of the jaws thereof secured respectively to the ends of members 27 and 28 and extend for a short distance forward of clamping member 19. Members 27 and 28 are substantially U-shaped in plan and have front bight portions to which said clamps 25 and 26 are respectively secured. The members 27 and 27 extend rearwardly and are horizontally disposed. The rear portions of said members are enlarged to form cylindrical portions 27a and 28a. Disposed in said cylindrical portions and extending outwardly therefrom for a short distance are rods 30 having slotted or bifurcated portions 30a. Compression coiled springs 31 surround said slotted portions 30a and are disposed in cylindrical portions 27a and 28a. One of the ends respectively of said springs bear against pins 33 disposed in and received in the bifurcations 30a of rods 30. The other ends respectively of said springs 31 bear against pins 34 disposed through cylindrical portions 27a and 28a passing between the bifurcations of rods 30.

Said rods 30 are respectively pivoted to the end of cylindrical portion 20b by pivot members 36.

Longitudinally extending guide bars 37 are shown. Said guide bars are made of any suitable material, such as metal, and are substantially rectangular in vertical cross section. Said guide bars are respectively disposed on either side of said clamping members 13 and 19. Said guide bars have reduced rounded end portions 37a and 37b respectively. Said end portions are rotatably received in supporting members 38 and 39 respectively. Said supporting members have outer U-shaped end portions 38a and 39a respectively which are disposed over the ends of frame 11 and are slidable laterally thereon. Set screws 40 are provided threaded into said U-shaped end portions and engage with the respective ends of said frame member to hold members 38 and 39 in position. Set screws 41 are threaded into members 39 and are adapted to contact the end portions 37b to hold the same in a given circumferential position.

In operation, in using applicant's steaking device, set screws 40 are first loosened and guide bars 37 are spaced apart laterally sufficiently to accommodate the fish to be steaked, and in Fig. 1 a fish 10 is shown. Said set screws are then tightened. Set screws 18 and 23 respectively are then loosened and clamping members 13 and 19 respectively are spaced apart slightly in excess of the length of the fish to be steaked, bars 17 and 21 moving in the ends of frame 12. Set screws 18 and 23 respectively are then tightened. The fish to be steaked is then placed in the device. The head portion of the fish is received in clamping member 13 being disposed between the jaws 13a which grip the fish through its eye socket portions. The block member 14 are then moved to engage the head of the fish at the sides thereof to hold the same in a fixed lateral position. Said block members are held securely in position by tightening set secrews 15.

The tail portion of the fish is gripped in jaws 19a of clamping member 19. Said last mentioned clamping member has resilient longitudinal movement so that the fish is held with longitudinal tension being placed thereon. The jaws of said clamping members are spring pressed and keep a firm grip.

The guide bars are moved rotatably to determine the proper plane in which to guide a knife, such as a knife 11 shown in Fig. 1, or other cutting blade in order to cut steaks of the desired thickness and so the knife can move along the back bone of the fish. Said guide bars are accommodated very nicely to various thicknesses of fish. Set screws 41 are tightened to hold said guide bars in the desired circumferential position, which position deters the plane of the cutting blade. A knife or other cutting tool used must have a sharp cutting blade. In steaking the fish, the cut is started adjacent the tail end of the fish with the cutting blade moving along the guide bars. When the cutting of the steak is started the portion where the cut is first started is placed in either clamping member 25 or 26, whichever is at the top, and is held therein. Said clamping member has resilient longitudinal movement and thus places longitudinal tension on the steak to be cut. The cutting blade then continues moving along the guide bars, cutting the steak evenly and uniformly. Thus by governing the plane in which the cutting blade moves, the steak can be cut at proper place and it is always accurately cut. When one side of the fish is steaked, the holding device is turned over and the same steaking operation as set forth is repeated to steak the other side of the fish.

Thus it is seen that I have provided a very practical and efficient holding device for steaking a fish. A fish placed in said device is held firmly under longitudinal tension and the steaks which are cut are also held under longitudinal tension during the cutting process. As a result, steaks are accurately cut and the cutting blade used moves in a single plane which is determined by guide bars. As a result the steaks cut are practically perfect and there is little or no waste.

Applicant's device has been thoroughly tested in actual operation and found to work very successfully and efficiently.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A device for steaking a fish having in combination a frame, knife-guiding means extending longitudinally of said frame adjacent each side thereof and disposed substantially in the same plane, said means being rotatable about their longitudinal axes respectively, gripping means secured respectively to opposite end portions of said frame and disposed between said first mentioned means for holding respectively the tail portion and head portion of a fish with said fish disposed flatwise in a substantially horizontal plane, resilient means acting on one of said gripping means to move it away from the other so as to place said fish under tension, said gripping means being disposed to hold said fish generally in the plane of said knife-guiding means whereby a knife can be moved along and in contact with said guiding means and be guided to cut steaks from said fish held in said gripping means.

2. A device for holding a fish in position to be steaked and for guiding a knife for steaking said fish, having in combination, a frame, knife-guiding members extending longitudinally of said frame adjacent each side thereof respectively and being disposed substantially in the same plane, gripping jaws supported in said frame at one end thereof adapted to hold the tail portion of a fish, second gripping jaws carried in the other end portion of said frame for gripping the head portion of said fish, said gripping means being disposed to hold said fish flatwise in a substantially horizontal plane between and in substantially the same plane as said knife-guiding members, whereby a knife can be moved and guided longitudinally of and in contact with said guide members for cutting steaks from said fish.

3. The structure set forth in claim 1, gripping jaws disposed at the upper and lower sides of said first mentioned gripping jaws and adapted to hold respectively the end portion of steaks cut from said fish.

4. A device for holding a fish for steaking and for guiding a knife for steaking said fish having in combination, a frame, a substantially flat bar at each side of said frame and extending longitudinally thereof, a gripping means disposed between said bars and carried in one end of said frame for holding the tail portion of a fish, a second gripping means carried in the other end of said frame for gripping the head portion of said fish, said gripping means being positioned to hold said fish flatwise in a substantially horizontal plane which is substantially the plane of said bars, a second gripping means carried by said first mentioned gripping means at one side thereof and positioned to engage the end of a steak partially cut from said fish whereby a knife can be moved longitudinally of said bars in engagement therewith and guided to cut steaks from said fish.

*5. A device for steaking a fish having in combination, a supporting means, longitudinally extending transversely spaced knife-guiding means carried by said means and disposed in substantially the same plane as said means, said knife-guiding means being movable to bring portions thereof into different planes for guiding a knife, opposed longitudinally spaced gripping means secured respectively to portions of said supporting means and disposed between said second mentioned means for holding respectively the tail portion and head portion of a fish with said fish disposed flatwise in a substantially horizontal plane, resilient means acting on one of said gripping means to move it away from the other so as to place said fish under tension, said gripping means being disposed to hold said fish generally in the plane of said knife-guiding means whereby a knife can be moved along*

*and in contact with said guiding means and be guided to cut steaks from said fish held in said gripping means.*

*6. The structure set forth in claim 5, said knife-guiding means being movable toward and from each other in different positions, and means on said supporting means for holding said knife-guiding means in said positions.*

*7. A device for steaking fish having in combination, a supporting member, longitudinally extending transversely spaced knife-guiding means carried by said member, said means being movable into different planes, means secured to said supporting member for engaging and holding the head portion of a fish, means secured to said supporting member for engaging and holding the tail portion of a fish, said last two means being oppositely disposed and adapted to hold said fish substantially in the plane of said knife-guiding means, and means associated with said knife-guiding means for moving said knife-guiding means into different planes whereby a knife-blade can be moved along said knife-guiding means to cut steaks from said fish.*

References Cited in the file of this patent or the original patent

UNITED STATES PATENTS

| | | |
|---|---|---|
| 867,182 | Bahde | Sept. 24, 1907 |
| 867,489 | Faulkingham | Oct. 1, 1907 |
| 1,259,109 | Kugler et al. | Mar. 12, 1918 |
| 1,438,091 | Bowe | Dec. 5, 1922 |
| 1,632,194 | Possehl | June 14, 1927 |

FOREIGN PATENTS

| | | |
|---|---|---|
| 115,341 | Germany | Nov. 22, 1900 |